United States Patent [19]

Matsuo et al.

[11] Patent Number: 4,622,056
[45] Date of Patent: Nov. 11, 1986

[54] METHOD OF PREPARING SILICA GLASS

[75] Inventors: Nobutaka Matsuo; Yoshitaka Itoh; Sadao Kanbe; Haruo Osafune; Masanobu Motoki, all of Nagano, Japan

[73] Assignee: Seiko Epson Corporation, Tokyo, Japan

[21] Appl. No.: 826,527

[22] Filed: Feb. 6, 1986

[30] Foreign Application Priority Data

Feb. 13, 1985 [JP] Japan .................................. 60-26001
Jul. 16, 1985 [JP] Japan ................................ 60-156670
Nov. 11, 1985 [JP] Japan ................................ 60-252301

[51] Int. Cl.$^4$ ............................................. C03B 19/06
[52] U.S. Cl. ........................................ 65/18.1; 65/17; 264/66
[58] Field of Search ...................... 65/18.1, 18.3, 17; 501/12; 264/63, 56, 66

[56] References Cited

U.S. PATENT DOCUMENTS

| 4,317,668 | 3/1982 | Susa et al. ............... 501/12 X |
| 4,389,233 | 7/1983 | Kurosaki et al. ......... 501/12 X |
| 4,426,216 | 1/1984 | Satoh et al. ............... 65/18.1 |

FOREIGN PATENT DOCUMENTS

| 55-167143 | 12/1980 | Japan ..................... 65/18.1 |
| 59-102833 | 6/1984 | Japan ..................... 501/12 |
| 60-27615 | 2/1985 | Japan ..................... 501/12 |

Primary Examiner—Kenneth M. Schor
Attorney, Agent, or Firm—Blum Kaplan Friedman Silberman & Beran

[57] ABSTRACT

A method for preparing high quality silica glass articles is provided. The glass is prepared by hydrolyzing silicon alkoxide with a basic reagent to yield a first solution, hydrolyzing a silicon alkoxide with an acid reagent to yield a second solution, mixing the first solution with the second solution at a predetermined mixing rate to yield a sol solution, pouring the sol solution into a container, gelling the sol solution to a wet gel, drying the wet gel to a dry gel, and sintering the dry gel to yield a silica glass.

34 Claims, No Drawings

METHOD OF PREPARING SILICA GLASS

BACKGROUND OF THE INVENTION

This invention relates to a method of preparing silica glass and, in particular, to a method of preparing silica glass by a sol-gel method.

Several methods for preparing silica glass by sol-gel methods are known. Such methods are disclosed, for example, in Nogami, Nakatani et al, "Journal of Non-Crystalline Solids", Vol. 37, 191 (1980), Rabinovitch et al, "Journal of Non-Crystalline Solids", Vol. 47, 435 (1982) and Toki et al, U.S. patent application Ser. No. 642,606 having foreign counterparts of Great Britian 84/18301, Germany P33 90 375.1, France 84900294 and Netherlands 83.20410.

According to the method of Toki et al, a sol solution of fine particle silica uniformly dispersed in a metal alkoxide hydrolyzed solution having a pH adjusted to between 3 and 6 is used to obtain a porous dry gel. The porous dry gel is sintered and a large silica glass, for example, of 15 cm in width, 15 cm length and 0.5 cm in thickness, which cannot be obtained by the other methods is prepared with good yield. Toki's method is the best of the three methods.

The silica glass obtained by sintering in accordance with Toki's method contains impurities such as metal ions, crystals, foams, and irregularly shaped foreign particles. When the silica glass is to be used for purposes requiring high quality glass, for example, as silica substrates for photo-masks or as preforms of optical fibers, the glass formed by this method is not of sufficiently high quality.

Accordingly, it is desirable to provide a method for preparing silica glass which overcomes the disadvantages found in prior art silica glass processes.

SUMMARY OF THE INVENTION

Generally speaking, in accordance with the invention, silica glass is prepared by the steps of hydrolyzing a silicon alkoxide with a basic reagent to yield a first solution, hydrolyzing a silicon alkoxide with an acid reagent to yield a second solution, mixng the first solution and the second solution at a predetermined mixing ratio to yield a sol solution, pouring the sol solution into a container, gelling the sol solution to a wet gel, drying the wet gel to a dry gel, and sintering the dry gel to yield a silica glass.

It is an object of the invetion to provide an improved method for preparing high quality silica glass.

It is another object of the present invention to provide a method for preparing high quality silica glass that is free of impurities such as metal ions, crystals, foams and other irregularly shaped foreign particles.

It is a further object of the invention to prepare large silica glass articles with good yield.

It is yet another object of the present invention to provide an economical method for preparing high quality silica glass.

Still other objects and advantages of the invention will in part be obvious and will in part be apparent from the specification.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

DETAILED DESCRIPTION OF THE PREFERRED EMBODIMENTS

The method for preparing silica glass includes the steps of hydrolyzing a silicon alkoxide with a basic reagent to yield a first solution containing fine particle silica, hydrolyzing silicon alkoxide with an acid reagent in order to yield a second solution, mixing the first and second solutons at a predetermined mixing ratio to obtain a sol solution, gelling the sol solution to a wet gel, drying the wet gel to a dry gel, and sintering the dry gel to obtain a silica glass.

Silicon alkoxide has the general formula $Si(OR)_4$ wherein R is an alkyl group. The silicon alkoxide can include, but is not limited to, silicon methoxide, silicon ethoxide, silicon propoxide, and the like. In a preferred embodiment, silicon ethoxide is used as the silicon alkoxide. Alternatively, the alkoxide can be referred to as alkyl silicates, such as methyl silicate, ethyl silicate, propyl silicate and the like, with ethyl silicate being the preferred species.

In order to optimize the utility of this method, the following requirements should be satisfied;

1. The mean particle diameter of the fine particle silica in the first solution obtained by hydrolyzing a silicon alkoxide with a basic reagent is between about 0.01 and 1.0 microns;
2. The concentration of the ultrafine particle silica in the first solution is greater than about 0.05 grams per millileter;
3. The mixing ratio of the first and second solutions is from about 0 to 100 and 100 to 0 and, more preferably, from about 20 to 80 and 85 to 15 in terms of the molar ratio of silica in the first and second solutions, respectively;
4. The effective concentration of silica in the sol solution is greater than about 0.10 g/ml;
5. The pH of the sol solution is adjusted to a predetermined value greater than 3 prior to gelling;
6. The sol solution is placed in a container having a predetermined shape prior to gelling and is maintained at a temperature between about 10° and 50° C. until the gel shrinks to some degree, preferably until the gel shrinks over 8% in length;
7. The wet gel is dried in a container having openings amounting to less than about 10% of the surface area of the container;
8. The inner surface of the container in contact with the sol solution is formed of a hydrophobic material;
9. The wet gel is dried by heating the gel from about 20° C. to a temperature in the range between about 50° and 160° C. at a heating rate of less than 120° C. per hour;
10. The step of sintering the dry gel to yield a transparent silica glass article comprises the steps of:
    (a) removing absorbed water;
    (b) removing carbon;
    (c) accelerating the dehydration condensation reaction;
    (d) closing pores in the dry gel; and
    (e) vitrifying the dry gel;
11. The absorbed water is removed by heating the dry gel to a first selected temperature in the range of about 20° and 400° C. at a heating rate of less than about 400° C. per hour and, if necessary, maintaining the gel at the first selected temperature for at least 1 hour;

12. Carbon is removed by heating the dry gel to a second selected temperature in the range of about 400° and 900° C. at a heating rate between about 30° and 400° C. per hour;

13. The dehydration condensation reaction is accelerated by heating the dry gel to a third selected temperature between about 900° and 1300° C. at a heating rate between about 1° and 400° C. per hour and, if necessary, maintaining the gel at the third selected temperature for at least 30 minutes;

14. The pores of the gel are closed by heating the gel to a fourth selected temperature in the range of about 900° and 1400° C. at a heating rate between about 30° and 400° C. per hour and, if necessary, maintaining the gel at the fourth selected temperature for a predetermined period of time, preferably for at least 1 hour;

15. The dry gel is vitrified by heating the gel to a fifth selected temperature and maintaining the gel at the fifth selected temperature for a predetermined period of time.

Of the above requirements, 1, 3 and 5 are designed to make a porous dry gel which is unlikely to fracture in the sintering step, 2 and 4 are designed to form a wet gel composition that is unlikely to fracture in the drying step, 6–9 are aging and drying conditions designed to form a dry gel with a good yield and 10–15 are sintering conditions designed to form a transparent silica glass with a good yield. By using this method, high quality silica glass articles having significantly less impurities in the form of metal ions, crystals, foams and other irregularly shaped foreign particles than can be obtained using conventional methods is prepared. Furthermore, by meeting one of the following conditions, foams and irregularly shaped foreign particles in the silica glass article are further reduced;

16. Hydroxyl groups and chlorine or fluorine are removed prior to closing the pores in the dry gel; and 17. 
   (a) The pores in the dry gel are closed under helium (He) atmosphere;
   (b) The pores in the dry gel are closed under reduced pressure; or
   (c) The dry gel are processed under He atmosphere prior to closing pore under reduced pressure.

Conditon 16 is a condition for reducing the hydroxyl groups in the glass and, by satisfying this condition, foaming is less likely to occur during the vitrification step and, accordingly, vitrification is facilitated. Furthermore, by meeting condition 16, a silica glass article having an extremely low hydroxyl group content is provided. Conditions 17(a)–(c) are conditions for filling the inside of the closed pores with He or reducing the pressure therein in order to minimize the space in which foams or foreign particles which are likely to be produced during vitrification and which have sizes of less than 1 micron can be included. By using the method described and meeting the requirements set forth above, silica glass articles of extremely high quality for use as preforms for optical fibers and silica substrates for photo-masks are easily obtained.

In order to maintain high quality silica glass with good and stable yields, the following conditions are also desirably chosen;

18. The materials used to form the first and second solutions are of high purity and micro-refuse and foreign particles are eliminated by distillation, filtration with a filter having a mesh of less than 0.2 microns and similar methods;

19. The step before pouring the sol solution into a predetermined container are performed in a clean environment of less than class 3000 and, more preferably, less than class 100;

20. Centrifugal force between about 50 and 10,000 G is applied to the first solution and the supernatant solution is mixed with the second solution;

21. The first solution is filtered at least once using a filter having a mesh finer than 50 microns prior to mixing the first and second solutions;

22. The second solution is filtered at least once using a filter having a mesh finer than 50 microns prior to mixing the first and second solutions;

23. The sol solution is filtered at least once using a filter having a mesh finer than 50 microns;

24. In the steps prior to gelation, the sol solution is processed under reduced pressure;

25. After the sol solution is placed into the predetermined container, the sol solution is gelled with the application of centrifugal force between about 50 and 500 G.

With respect to conditions 18, 21, 22 and 23, the finer the mesh of the filter, the better.

For a better understanding of the invention, reference is made to the following examples. These examples are presented for purposes of illustration only and are not intended to be construed in a limiting sense.

EXAMPLE 1

Preparation of the first solution 704.8 g of refined commercially available silicon ethoxide, 3766 ml of anyhydrous ethanol, 225.9 ml of ammonia water (29%) and 243.8 g of water were mixed and the mixture was stirred violently for 2 hours. The resulting solution was maintained in a cool dark place over night without stirring in order to yield fine particle silica. The solution was condensed under reduced pressure to 560 ml and the pH was adjusted to 4.5 using 2 normal hydrochloric acid to yield the first solution.

The first solution contained 203.9 g of silica particles having a mean particle diameter of 0.14 microns. The calculated silica density was 0.33 g/ml.

Preparation of the second solution 199.5 g of 0.02 normal hydrochloric acid was added to 576.6 g of refined commercially available silicon ethoxide and the mixture was stirred violently in order to carry out the hydrolysis and yield the second solution.

Preparation of the sol solution and gelation

The first and second solutions were mixed and the pH of the mixture was adjusted to 4.7 using 0.2 normal ammonia water and water and the volume was adjusted to 1600 ml to yield the sol solution. The effective concentration of silica in the sol solution was 0.231 g/ml.

The sol solution was poured into a container having the dimensions of 400 mm × 400 mm × 100 mm and the container was sealed with a lid. The sol was gelled within 45 minutes after adjustment of the pH and a wet gel was obtained.

Drying

The wet gels were maintained in the sealed container and aged for 2 days. Then the lid was replaced by another lid formed with apertures comprising 0.4% of the surface area of the lid and the wet gel was dried at 60° C. After 14 days, 9 out of 10 dry gels were obtained without fractures. Yield=90%.

Sintering

The 9 dry gels were placed in a sintering oven and heated from 30° to 200° C. at a heating rate of 30° C. per hour. The gels were maintained at 200° C. for 5 hours and then heated from 200° to 300° C. at a heating rate of 30° C. per hour. The gels were maintained at 300° C. for 5 hours in order to remove absorbed water. The gels were heated further from 300° to 1050° C. at a heating rate of 30° C. per hour and maintained at 1050° C. for 30 minutes in order to remove carbon and ammonium chloride and accelerate the dehydration condensation reaction. The gels were heated to 1250° C. at a heating rate of 30° C. per hour and maintained at 1250° C. for 30 minutes to close the pores. The gels were then heated to 1400° C. at a heating rate of 60° C. per hour and maintained at 1400° C. for 1 hour to close pores. 9 transparent silica glass articles were obtained. Yield=100%.

Silica glass plates having the dimensions of 18 cm×18 cm×2 mm were obtained by polishing both side of the silica glass articles.

In preparing the second solution, when the hydrolysis was carried out with the addition of more than 20% alcohol with respect to the silicon alkoxide, the reaction progressed more uniformly. Accordingly, the viscosity of the second solution and of the resulting sol solution was lowered, thereby facilitating handling of the solution. However, when this method was used, the transparent glass articles obtained were slightly smaller indicating that economy should be considered when determining whether or not to use this method.

EXAMPLE 2

In order to study optimum conditions for making silica glass articles of the size of those of Example 1 with good yield, various experiments were conducted and the results are shown in Table 1.

Based on the results of these experiments, the following conditions are optimum:
1. The mean particle diameter of the fine particle silica in the first solution obtained by hydrolyzing a silicon alkoxide with a basic reagent is between about 0.01 and 1.0 microns;
2. The concentration of ultrafine particle silica in the first solution is greater than about 0.05 g/ml;
3. The mixing ratio of the first and second solutions is from about 0 to 100 and 100 to 0 and, more preferably, from about 20 to 80 and 85 to 15 in terms of the molar ratio of silicon in the first and second solutions, respectively;
4. The effective concentration of silica in the sol solution is greater than about 0.10 g/ml;
5. The pH of the sol solution is adjusted to a predetermined value greater than 3 prior to gelling;
6. The wet gel is dried in a container having openings amounting to less than about 10% of the surface area of the lid of the container;
7. The wet gel is dried by heating the gel from about 20° C. to a temperature in the range between about 50° and 160° C. at a heating rate of less than 120° C. per hour;
8. The step of sintering the dry gel to yield a transparent silica glass article comprises the steps of:
    (a) removing absorbed water;
    (b) removing carbon
    (c) accelerating the dehydration condensation reaction;
    (d) closing pores in the dry gel; and
    (e) vitrifying the dry gel;
9. The absorbed water is removed by heating the dry gel to a first selected temperature in the range of about 20° and 400° C. at a heating rate of less than about 400° C. per hour and, if necessary, maintaining the gel at the first selected temperature for at least 1 hour;
10. Carbon is removed by heating the dry gel to a second selected temperature in the range of about 400° and 900° C. at a heating rate between about 30° and 400° C. per hour;

TABLE 1

| No | $\bar{a}$ (μm) | $C_1$ (g/ml) | 1/1 + 2 (%) | $C_2$ (g/ml) | pH | opening rate (%) | drying condition | sintering condition | yield after drying (%) | yield after sintering (%) |
|----|------|------|----|-------|-----|-----|----|----|----|----|
| 1  | 0.005 | 0.20 | 55 | 0.15  | 4.7 | 0.4 | *  | *  | 0  | —  |
| 2  | 0.05  | 0.28 | 55 | 0.231 | 4.7 | 0.4 | *  | *  | 80 | 100 |
| 3  | 0.14  | 0.32 | 55 | 0.231 | 4.7 | 0.4 | *  | *  | 90 | 100 |
| 4  | 0.33  | 0.33 | 55 | 0.231 | 4.7 | 0.4 | *  | *  | 100 | 100 |
| 5  | 1.5   | 0.35 | 55 | 0.231 | 4.7 | 0.4 | *  | *  | 30 | 67 |
| 6  | 0.14  | 0.45 | 55 | —     | —   | —   | —  | —  | particles separated out during condensation | |
| 7  | 0.14  | 0.05 | 55 | 0.10  | 5.0 | 0.4 | *  | *  | 20 | 0 |
| 8  | 0.14  | 0.32 | 80 | 0.231 | 4.7 | 0.4 | *  | *  | 50 | 80 |
| 9  | 0.14  | 0.32 | 20 | 0.231 | 4.7 | 0.4 | *  | *  | 0  | — |
| 10 | 0.14  | 0.32 | 55 | 0.1   | 5.5 | 0.4 | *  | *  | 20 | 0 |
| 11 | 0.14  | 0.32 | 55 | 0.18  | 5.0 | 0.4 | *  | *  | 60 | 83 |
| 12 | 0.14  | 0.32 | 55 | 0.231 | 3.0 | 0.4 | *  | *  | more than 1 week is required for gelation - economically undesirable 20 | — |
| 13 | 0.14  | 0.32 | 55 | 0.231 | 4.7 | 10  | *  | *  | 0  | — |
| 14 | 0.14  | 0.32 | 55 | 0.231 | 4.7 | 0.4 | ** | ** | 0~100 | 0~100 |

$\bar{a}$ The mean particle diameter of fine particle silica included in the first solution
$C_1$ The concentration of fine particle silica included in the first solution
1/1 + 2 The molar number of the silicon included in the first solution with respect to the molar number of the molar number of the silicon included in the first and the second solutions
$C_2$ The concentration of effective silica content of the sol solution
pH The pH of the sol solution
opening rate The rate of the area of the opening of the lid with respect to the surface area of the lid
* The drying conditions and the sintering conditions were the same as in Embodiment 1
** Various conditions were examined.

11. The dehydration condensation reaction is accelerated by heating the dry gel to a third selected temperature between about 900° and 1300° C. at a heating rate between about 1° and 400° C. per hour and, if necessary, maintaining the gel at the third selected temperature for at least 30 minutes;
12. The pores of the gel are closed by heating the gel to a fourth selected temperature in the range of about 900° and 1400° C. at a heating rate between about 30° and 400° C. per hour and, if necessary, maintaining the gel at the fourth selected temperature for a predetermined period of time, preferably for at least 1 hour;
13. The dry gel is vitrified by heating the gel to a fifth selected temperature and maintaining the gel at the fifth selected temperature for a predetermined period of time.

EXAMPLE 3

In order to determine the conditions necessary for obtaining extremely high quality silica glass, various experiments were conducted and the results are shown in Table 2.

TABLE 2

| No | pores closing | material refining | cleanliness | centrifugal *1 1st | filter #2 1st | filter #2 2nd | filter #2 sol | reduced pressure *3 (sol) | centrifugal *4 (sol) | crystals | foams larger than 1 μm *5 | irregularly shaped foreign particles larger than 1 μm *5 | foams & foreign particles smaller than 1 μm *6 | total evaluation *7 |
|---|---|---|---|---|---|---|---|---|---|---|---|---|---|---|
| 1 | in the air | O | class 3000 | O | 0.4 | 0.2 | 1μ | O | O | O | Δ | O | X | D |
| 2 | He | O | class 3000 | O | 0.4 | 0.2 | 1μ | X | X | O | O | O | O | B |
| 3 | reduced pressure | O | class 3000 | O | 0.4 | 0.2 | 1μ | X | X | O | O | O | O | B |
| 4 | He + reduced pressure | O | class 3000 | O | 0.4 | 0.2 | 1μ | X | X | O | O | O | O | B |
| 5 | He | X | class 3000 | O | 0.4 | 0.2 | 1μ | X | X | Δ | O | Δ | X | C |
| 6 | He | O | X | O | 0.4 | 0.2 | 1μ | X | X | O | O | O | X | C |
| 7 | He | O | class 100 | O | 0.4 | 0.2 | 1μ | X | X | O | O | O | O | A |
| 8 | He | O | class 3000 | O | 0.4 | 0.2 | X | X | X | O | O | O | O | B |
| 9 | He | O | class 3000 | X | 0.4 | 0.2 | 1μ | X | X | O | O | O | Δ | B |
| 10 | He | O | class 3000 | O | X | 0.2 | 1μ | X | X | O | O | O | Δ | B |
| 11 | He | O | class 3000 | O | 0.4 | X | 1μ | X | X | O | O | O | Δ | B |
| 12 | He | O | class 3000 | O | X | X | 1μ | X | X | O | O | O | Δ | B |
| 13 | He | O | class 3000 | O | X | X | X | X | X | O | O | Δ | Δ | C |
| 14 | He | O | X | O | X | X | X | X |  | O | O | Δ | X | C |
| 15 | He | O | class 3000 | O | 0.4 | 0.2 | 1μ |  | X | O | O | O | O | A |
| 16 | He | O | class 3000 | O | 0.4 | 0.2 | 1μ | X | O | O | O | O | O | A |
| 17 | He | O | class 3000 | O | 0.4 | 0.2 | 1μ | O | O | O | O | O | O | A |
| 18 | He *8 | O | class 3000 | O | 0.4 | 0.2 | 1μ | X | O | O | O | O | O | A |

*1 1000 G 1 hour O . . . processed X . . . unprocessed
*2 pore diameter of final filter (membrane type) X . . unprocessed
*3 50 mm mg 2 minutes O . . . processed X . . . unprocessed
*4 200 G about 45 minutes O . . . processed X . . . unprocessed
*5 number of foreign particles per 1 inch square O . . . (0~1) Δ . . . (1~10) X . . . (>10)
*6 The light of condensor lamp was irradiated and its scattering was observed by naked eyes.
◎ . . . nothing was seen
O . . . almost nothing was seen
Δ . . . a sprinkling was seen
X . . . seemed hazy
*7 A . . . most excellent quality
B . . . extremely high quality
C . . . high quality
D . . . normal
*8 After removing OH group and removing chlorine pores were closed.

The detailed experimental conditions used were the same as those used in Example 1. The step of removing hydroxyl groups and chlorine and fluorine was performed as follows: after accelerating the dehydration condensation reaction as described in Example 1, the gel was cooled to 700° C. and maintained at 700° C. for 30 minutes while a mixture gas of 2 l/mm of He and 0.2 l/mm of $Cl_2$ flowed through the sintering oven. The gel was heated to 800° C. at a heating rate of 60° C. per hour while He gas only flowed through the oven and the gel was maintained at 800° C. for 1 hour while a mixture gas of 2 l/mm of He and 0.2 l/mm of $Cl_2$ flowed through the oven. The gel was heated further to 900° C. at a heating rate of 60° C. per hour while He gas only flowed through the oven and the gel was maintained at 900° C. for 1 hour while a mixture gas of 2 l/mm of He and 0.2 l/mm of $Cl_2$ flowed through the oven.

Chlorine was removed by this procedure: the gel was heated to 1000° C. at a heating rate of 60° C. per hour while a mixture gas of He and $O_2$ flowed through the oven in a ratio of 2 l/mm to 0.4 l/mm and the gel was maintained at 1000° C. for 1 hour in order to remove chlorine and fluorine. The rest of the method was carried out as described in Example 1.

Based on the experiments, it is preferable to select at least some of the following conditions in order to optimize the economic viability of the method:

1. Hydroxyl groups and chorine or fluorine are removed prior to closing the pores in the dry gel;
2. 
   (a) The pores in the dry gel are closed under helium (He) atmosphere;
   (b) The pores in the dry gel are closed under reduced pressure; or
   (c) The pores in the dry gel are closed under reduced pressure after under He atmosphere;
3. The materials used to form the first and second solutions are of high purity and micro-refuse and foreign particles are eliminated by distillation, filtration with a filter mesh of less than 0.2 microns and similar methods;
4. The step of placing the sol solution into a predetermined container is performed in a clean environment of less than class 3000 and, more preferably, less than class 100;
5. Centrifugal force between about 50 and 10,000 G is applied to the first solution and the supernatant liquid is mixed with the second solution;
6. The first solution is filtered at least once using a filter having a mesh finer than 50 microns prior to mixing the first and second solutions;
7. The second solution is filtered at least once using a filter having a mesh finer than 50 microns prior to mixing the first and second solutions;
8. The sol solution is filtered at least once using a filter having a mesh finer than 50 microns;
9. In the steps prior to gelation, the sol solution is processed under reduced pressure; and
10. After the sol solution is placed into the predetermined container, the sol solution is gelled with the application of centrifugal force of between about 50 and 500 G.

EXAMPLE 4

Preparation of first solution 1678.0 g of silicon ethoxide, 3585 ml of anhydrous ethanol, 109 ml of 29% ammonia water and 580.6 g of water were mixed and the mixture was stirred violently. The solution was maintained in a cool dark place over night without stirring in order to age the silica particles.

The resulting solution was condensed under reduced pressure and the alcohol in the condensed solution was replaced by water in order to improve the yield in the drying step. The pH of the solution was adjusted to 4.0 by the addition of 2 normal hydrochloric acid in order to prevent abrupt gelation when the solution was mixed with the second solution. The resulting solution was filtered using a membrance filter having a 0.6 micron mesh in order to obtain a silica dispersed solution in which the silica particles had a mean particle diameter of 0.18 microns. The solution obtained was referred to as the first solution.

Preparation of the second solution 950.0 g of 0.02 normal hydrochloric acid was added to 1372.9 g of silicon ethoxide and the solution was stirred violently in order to yield the second solution.

Preparation of the sol solution and gelation

The first and second solutions were mixed and the pH of the mixture solution was adjusted to 4.69 by the addition of 0.2 normal ammonia water and water and the volume was adjusted to 4000 ml in order to yield the sol solution. The effective silica concentration of the sol solution was 0.220 g/ml.

The sol solution was placed into a cylindrical container having an inner diameter of 50 mm, a height of 2100 mm and a depth of 2000 mm. Air in the container was evacuated for 2 minutes at a pressure of 50 Torr and the container was covered by lids and sealed. Gelation occurred 40 minutes after the pH of the sol solution was adjusted and a wet gel was obtained.

Preparation of the first and second solutions and of the sol solution was performed in a clean room of class 100. The silicon ethoxide, ethanol and water were refined by distillation prior to use and the hydrochloric acid and ammonia reagents were of a grade including minimal amounts of metal ion impurities which had been filtered by a membrane filter having a 0.2 micron mesh.

Drying 10 wet gels were aged in sealed containers for 3 days and were then placed into a rotatable container having openings amounting to 0.2% of the surface area. The wet gel was dried at 60° C. while the rotating container was rotated at a rotating rate of 0.1 rotations per minute. After 17 days, 9 dry gels that were stable enough so that no fractures occurred even at room temperature were obtained. Yield=90%. The volume density of the dry gels was 0.72 g/cm³.

Sintering

The 9 dry gels were placed into a sintering oven heated to 200° C. at a heating rate of 30° C. per hour and maintained at 200° C. for 5 hours. The gels were heated further to 300° C. at a heating rate of 30° C. per hour and maintained at 300° C. for 5 hours in order to remove absorbed water. The gels were heated from 300° C. to 920° C. at a heating rate of 60° C. per hour and maintained at 920° C. for 2 hours in order to remove carbon and ammonium chloride and accelerate the dehydration condensation reaction. The gels were cooled to 800° C. and maintained at 800° C. for 30 minutes while a mixture gas of $Cl_2$ at 0.2 l/min and He at 2 l/m flowed through the oven. The gels were heated to 900° C. at a heating rate of 60° C. per hour, maintained at 900° C. for 1 hour and then heated to 1000° C. at a heating rate of 60° C. per hour and maintained at 1000° C. for 3 hours in order to remove hydroxyl groups. While $O_2$ gas flowed through the sintering oven at a rate of 1 l/min, the gels were heated to 1100° C. at a heating rate of 60° C. per hour and maintained at 1100° C. for 30 hours in order to remove chlorine. Then while He gas only flowed through the oven, the gels were heated to 1250° C. at a heating rate of 30° C. per hour and maintained at 1250° C. for 30 minutes in order to close the pores in the gel. The gels were then heated to 1450° C. at a heating rate of 60° C. per hour and maintained at 1450° C. for 1 hour. The gels became non-porous and 9 cylindrical transparent glass articles were obtained. Yield = 100%.

The dimensions of the glass articles obtained were 23.2 mm outer diameter and 928 mm length. The glass articles weighed 862 g. The yield of the material approached 100%.

The transparent glass articles obtained were perceived to be of uniform quality and sufficient clarity based on observation by the naked eye.

When the transparent glass article obtained was drawn using a fluoric polymer as a clad, more than 10 km of optical fiber having a core diameter of 200 micron and a clad diameter of 300 micron was obtained for each transparent glass article. The transmission loss of the optical fiber was less than 4 dB/km over a wavelength of 0.85 microns. The quality of this optical fiber as an optical fiber for local area networks was satisfactory.

Furthermore, the transparent glass articles prepared had very good light transmittance properties and were useful as light transmission silica bars having a diameter between several hundred microns and several centimeters, either by themselves or as a Q fiber. Such light transmission silica bars can be used as illuminating means for, for example, farms, space stations or underwater ranches.

EXAMPLE 5

The sol solution prepared in Example 1 was gelled using a rotating gelation means and a tubular wet gel of 50 mm outer diameter, 25 mm inner diameter and 2000 mm length was obtained. 10 wet gels were dried and sintered by following the steps described in Example 1 and 10 transparent silica glass articles were obtained. Yield = 100%.

The transparent glass articles obtained had an outer diameter of 23.2 mm, an inner diameter of 11.6 mm and length of 9.28 mm.

The transparent glass articles were drawn using a fluoric polymer as a clad and more than 8 km of optical fiber having a core diameter of 200 microns and a clad diameter of 300 microns was obtained for each silica glass article. The transmission loss of the optical fibers obtained was 4 dB/km over a wavelength of 0.85 microns. Accordingly, the optical fiber obtained was useful as an optical fiber for local area networks.

Since the transparent glass articles obtained were tubular, they were useful as support tubes for MCVD, jacket tubes for preforms used in VAD or MCVD and clad tubes used in rod-in-tube methods.

Since the transparent glass articles obtained include very little water, specifically, less than 100 ppb, the transparent glass can be used to produce extremely high quality optical fibers.

EXAMPLE 6

The sol solution prepared in Example 4 was placed into a teflon container having outer dimensions of 200 mm$^\square \times 100$ mm$^t$ to a depth of 80 mm. The sol solution was gelled in the container. By drying and sintering the gel at a rate slower than that described in Example 4, a silica glass article having dimensions of 92 mm$^\square \times 37$ mm was obtained.

The silica glass articles passed ultraviolet and visible light well and even passed light at a wavelength of 200 nm. Such silica glass can be used as a photo-mask in the manufacture of ultralarge scale integrated circuits of more than 1 Mbit scale.

Furthermore, because the silica glass articles obtained in this embodiment were thick, the glass could be processed to a lens or prism. The lenses obtained were used in the manufacture of 256 Kbit SRAM.

EXAMPLE 7

Preparation of the first solution

Ethyl silicate (otherwise known as silicon ethoxide), ethanol and water were refined by distillation. These components and guaranteed commercially available 29% ammonia water were filtered using a membrane filter having a 0.2 micron mesh were mixed at the compositions shown in Table 3.

TABLE 3

| the first solution | A | B | C |
|---|---|---|---|
| ethyl silicate | 44.1 liter | 44.1 liter | 44.1 liter |
| ethanol | 67.2 liter | 67.2 liter | 67.2 liter |
| water | 16.0 liter | 15.6 liter | 15.0 liter |
| ammonia water | 0.8 liter | 1.2 liter | 1.8 liter |

Each solution was stirred violently for 4 hours and was maintained in a cool dark place over night without stirring in order to yield fine particle silica. The solution was condensed, the pH was adjusted and the solution filtered using a membrane filter having a 10 micron mesh. The resulting solution was referred to as the first solution.

The mean particle diameter of the fine particle silica included in the resulting first solutions A, B and C were 0.15 microns, 0.25 microns and 0.4 microns, respectively.

Preparation of the second solution 6.15 l of 0.02 normal hydrochloric acid was filtered using a membrane filter having a 0.2 micron mesh and was added to 18.9 l of silicon ethoxide refined by distillation. The mixed solution was stirred violently in order to carry out the hydrolyzation of the silicon ethoxide. The resulting solution was referred to as the second solution. For purposes of this example, three second solutions were prepared.

Preparation of the sol solution

First solution A and one of the second solutions were mixed and the solution was filtered using a membrane filter having a 0.8 micron mesh. The solution was referred to as sol solution A.

Similarly, first solution B and one of the remaining second solutions were mixed and the mixture was filtered using a membrane filter having a 2.0 micron mesh. The solution was referred to as sol solution B.

Similarly, first solution C and the remaining second solution were mixed and the mixture was filtered using a membrane filter having a 3.0 micron mesh. The resulting solution was referred to as sol solution C.

The pH and liquid temperature of each of the sol solutions was 4.5 and 20° C., respectively.

Gelation and drying 900 ml of sol solution A was placed into each of 50 containers having inner dimensions of 300 mm × 300 mm × 100 mm$^d$. The containers were sealed with lids and sol solution A was gelled to yield 50 wet gels. 50 wet gels of each of sol solutions B and C were formed in the same manner.

The 150 wet gels in the sealed containers were aged at 30° C. for 3 days and the lids were replaced by other lids having openings amounting to 0.4% of the surface area of the lids. The gels were dried in the containers at 65° C. After 14 days, dry gels that were sufficiently stable so that no fracturing occurred even under atmospheric conditions were obtained. Yield is shown in Table 4.

TABLE 4

| used sol solution | yield (%) |
|---|---|
| sol solution A | 62 |
| sol solution B | 78 |
| sol solution C | 84 |

Sintering

Each of the three types of dry gels were placed in sintering ovens by 10's and heated from 30° to 200° C. at a heating rate of 60° C. per hour and maintained at 200° C. for 5 hours. The gels were heated further from 200° to 300° C. at a heating rate of 60° C. per hour and maintained at 300° C. for 5 hours in order to remove the absorbed water. The gels were heated from 300° to 700° C. at a heating rate of 60° C. per hour, maintained at 700° C. for 20 hours, heated from 700° to 900° C. at a heating rate of 60° C., maintained at 900° C. for 10 hours, and then heated further from 900° to 1000° C. at a heating rate of 60° C, per hour and maintained at 1000° C. for 10 hours in order to remove carbon and ammonium chloride and to accelerate the dehydration condensation reaction. While He gas flowed into the sintering oven, the temperature was raised to 1200° C. at a heating rate of 60° C. per hour and the gels were maintained at 1200° C. for 2 hours in order to close the pores in the gels. The gels were heated further to 1300° C. at a heating rate of 60° C. per hour and maintained at 1300° C. for 1 hour. The gels became non-porous and 30 transparent silica glass articles were obtained. Yield=100%.

Silica glass plates having dimensions of 152 mm × 152 mm × 3 mm' were obtained by polishing both surfaces of each of the resulting silica glass articles.

The silica glass articles of this example include no observable foreign particles and were of extremely high quality. The spectral characteristics of the glass over the ultraviolet and visible range were flat. Accordingly, the silica glass articles were of satisfactory quality for use as photo-mask substrates for manufacture of integrated circuits.

EXAMPLE 8

10 of each of the 3 kinds of dry gels obtained in the previous example (30 in all) were sintered as follows: the gels were heated from 30° to 200° C. at a heating rate of 30° C. per hour and maintained at 200° C. for 5 hours, heated from 200° to 300° C. at a heating rate of 30° C. per hour and maintained at 300° C. for 5 hours to remove absorbed water. The gels were heated further from 300° to 700° C. at a heating rate of 30° C. per hour, maintained at 700° C. for 20 hours, heated from 700° to 900° C. at a heating rate of 30° C. per hour and maintained at 900° C. for 10 hours in order to remove carbon and ammonium chloride and to accelerate the dehydration condensation reaction. The gels were cooled to 700° C. and maintained for 30 minutes while a mixture gas of He at 20 l/min and $Cl_2$ at 2 l/min flowed through the oven, heated to 1000° C. at a heating rate of 30° C. per hour and maintained at 1000° C. for 5 hours to remove hydroxyl groups. The gels were maintained at 1000° C. for 1 hour as $O_2$ gas flowed through the sintering oven at a rate of 20 l/min. The gels were then heated to 1100° C. at a heating rate of 60° C. per hour and maintained for 20 hours in order to remove chlorine. The gels were maintained at 1100° C. for 1 hour while He gas flowed through the oven at a rate of 20 l/min and were then heated to 1200° C. at a heating rate of 30° C. per hour, maintained at 1200° C. for 10 hours, heated further to 1250° C. at a heating rate of 30° C. per hour and maintained at 1250° C. for 10 hours in order to close the pores in the gels. The temperature was raised to 1400° C. at a heating rate of 60° C. per hour and the gels were maintained at 1400° C. for 1 hour. The gels became non-porous and 30 transparent glass articles were obtained. Yield=100%.

Silica glass plates having dimensions of 152 mm × 152 mm × 3 mm were obtained by polishing both surfaces of the glass articles.

No foreign particles were observed in the silica glass plates of this example and the silica glass was of extremely high quality. Additionally, the spectral characteristics of the glass over the ultraviolet and visible range were flat and the glass was suitable for use as photo-mask substrates in the manufacture of integrated circuits. Furthermore, hydroxyl groups in the glass were less than 1 ppm and the glass was transparent over the range from ultraviolet to infrared. Accordingly, the glass prepared in accordance with this example was of satisfactory quality for use as cells for various kinds of chemical, biological, physical and optical experiments.

The invention is useful, non only for the preparation of pure silica glass articles, but also for silica glass articles containing dopants such as titanium.

In accordance with the invention, by using a method in which a first solution containing fine particle silica obtained by hydrolyzing silicon alkoxide with a basic reagent and a second solution obtained by hydrolyzing silicon alkoxide with an acid reagent at a predetermined mixing ratio to yield a sol solution of high purity, the sol solution was gelled in a predetermined container to a wet gel, the wet gel was dried to a porous dry gel and the dry gel is sintered to a glass, a silica glass article containing an extremely small amount of impurities such as metal ions, crystals, foams and irregularly shaped foreign particles is provided with good yield.

Furthermore, during the sintering step, when the pores in the gel are closed under He atmosphere, under reduced pressure or under reduced pressure after processing the dry gel in He atmosphere, fine foams or irregularly shaped foreign particles of less than 1 micron in size were almost completely eliminated and silica glass articles of extremely high quality were obtained. Removal of hydroxyl groups and chlorine or fluorine prior to closing the pores was also useful.

Furthermore, by incorporating conditions to prevent the inclusion of refuse, foreign particles and the like and removal of the refuse, foreign particles and the like, silica glass articles of extremely high quality are provided with good and stable yields.

It will thus be seen that the objects set forth among those made apparent from the preceding description are efficiently attained and, since certain changes may be made in carrying out the above method and in the article set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for preparing silica glass articles, comprising:
preparing a first solution by hydrolyzing silicon alkoxide with a basic reagent;
preparing a second solution by hydrolyzing silicon alkoxide with an acid reagent;
mixing the first and second solutions together at a predetermined mixing ratio in order to yield a sol solution;
pouring the sol solution into a container;
gelling the sol solution to a wet gel;
drying the wet gel to a dry gel; and
sintering the dry gel to yield a silica glass article.

2. The method of claim 1, wherein the sintering step comprises closing pores in the dry gel under He atmosphere.

3. The method of claim 1, wherein the sintering step comprises closing pores in the dry gel under reduced pressure.

4. The method of claim 1, wherein the sintering step comprises closing pores in the dry gel under reduced pressure after processing the dry gel in He atmosphere.

5. The method of claim 2, wherein hydroxyl groups and chlorine and fluorine are eliminated from the dry gel prior to closing the pores.

6. The method of claim 3, wherein hydroxyl groups and chlorine and fluorine are eliminated from the dry gel prior to closing the pores.

7. The method of claim 4, wherein hydroxyl groups and chlorine and fluorine are eliminated from the dry gel prior to closing the pores.

8. The method of claim 1, wherein the silica glass article is a plate.

9. The method of claim 1, wherein the silica glass article is cylindrical.

10. The method of claim 1, wherein the silica glass article is tubular.

11. A method for preparing silica glass articles comprising:
preparing a first solution by hydrolyzing silicon alkoxide with a basic reagent;
preparing a second solution by hydrolyzing silicon alkoxide with an acid reagent;
mixing the first and second solutions together at a predetermined mixing ratio in order to yield a sol solution;
pouring the sol solution into a container;
gelling the sol solution to a wet gel;
drying the wet gel to a dry gel; and
sintering the dry gel by a method comprising the steps of:
removing absorbed water;
removing carbon;
accelerating the dehydration condensation reaction;
closing pores in the dry gel under He atmosphere or under reduced pressure or under reduced pressure after processing the dry gel in He atmosphere; and
vitrifying the dry gel to yield a silica glass article.

12. The method of claim 11, wherein the mean particle diameter of the fine particle silica in the first solution is between about 0.01 and 1.0 microns.

13. The method of claim 11, wherein the concentration of fine particle silica in the first solution is greater than about 0.05 g/ml.

14. The method of claim 11, wherein the mixing ratio of the first and second solutions is between about 0 and 100 and about 100 and 0.

15. The method of claim 14, wherein the mixing ratio of the first and second solutions is between about 20 and 85 and about 80 and 15.

16. The method of claim 11, wherein the effective concentration of silica in the sol solution is greater than about 0.10 g/ml.

17. The method of claim 11, wherein the pH of the sol solution is adjusted to a value greater than 3 prior to gelling.

18. The method of claim 11, wherein the sol solution is placed in a container having a predetermined shape prior to gelling and is maintained at a temperature between about 10° and 50° C. until the gel shrinks to some degree.

19. The method of claim 11, wherein the wet gel is dried in a container having openings amounting to less than about 10% of the surface area of the container.

20. The method of claim 11, wherein the inner surface of the container is formed of a hydrophobic material.

21. The method of claim 11, wherein the wet gel is dried by heating the gel to a temperature between about 50° and 160° C. at a heating rate of less than 120° C. per hour.

22. The method of claim 11, wherein absorbed water is removed by heating the dry gel to a first selected temperature in the range between about 20° and 400° C. at a heating rate of less than about 400° C. per hour and maintaining the gel at the first selected temperature for at least one hour.

23. The method of claim 11, wherein carbon is removed by heating the gel to a second selected temperature in the range between about 400° and 900° C. at a heating rate between about 30° and 400° C. per hour.

24. The method of claim 11, wherein the dehydration condensation reaction is accelerated by heating the gel to a third selected temperature between about 900° and 1300° C. at a heating rate between about 1° and 400° C. per hour and maintaining the gel at the third selected temperature for at least 30 minutes.

25. The method of claim 11, wherein pores are closed in the gel by heating the gel to a fourth selected temperature in the range between about 900° and 1400° C. at a heating rate between about 30° and 400° C. per hour and maintaining the gel at the fourth selected temperature for at least one hour.

26. The method of claim 11, wherein the dry gel is vitrified by heating the gel to a fifth selected temperature and maintaining the gel at the fifth selected temperature for a predetermined period of time.

27. The method of claim 11, wherein the sintering process further comprises removing hydroxyl groups and chlorine and fluorine prior to closing the pores in the dry gel.

28. The method of claim 11, wherein the materials used to prepare the first and second solutions are of high purity and microrefuse and foreign particles are eliminated by distillation or filtration with a filter having a mesh of less than 0.2 microns.

29. The method of claim 11, wherein the steps before pouring the sol solution into a container are performed in a clean environment of less than class 3000.

30. The method of claim 29, wherein the steps before pouring the sol solution into a container are performed in a clean environment of less than class 100.

31. The method of claim 11, wherein the first solution is subjected to centrifugal force between about 50 and 10,000 G and the supernatant solution is mixed with the second solution prior to mixing the first and second solutions.

32. The method of claim 11, wherein at least one of the first solution, the second solution and the sol solution is filtered at least once using a filter having a mesh finer than 50 microns.

33. The method of claim 11, wherein the sol solution is processed under reduced pressure at least once prior to the gelation step.

34. The method of claim 11, wherein the sol solution is gelled with the application of centrifugal force between about 50 and 500 G.

* * * * *